S. H. FRENCH & W. J. MALTBY.
Vehicle Wheel.

No. 233,498.　　　　　　　　Patented Oct. 19, 1880.

UNITED STATES PATENT OFFICE.

STEPHEN H. FRENCH AND WILLIAM J. MALTBY, OF BELLE PLAIN, TEXAS.

VEHICLE-WHEEL.

SPECIFICATION forming part of Letters Patent No. 233,498, dated October 19, 1880.

Application filed February 16, 1880.

*To all whom it may concern:*

Be it known that we, STEPHEN H. FRENCH and WILLIAM J. MALTBY, of Belle Plain, Callahan county, State of Texas, have invented a new and useful Improvement in Vehicle-Wheels; and we do hereby declare that the following is a full, clear, and exact description of the same.

Our invention has for its object to remedy certain defects of vehicle-wheels as ordinarily constructed. The features of novelty are the construction and combination of parts whereby the spokes may be adjusted radially outward, and also forced tightly together around the axle-box, to compensate for shrinkage.

Figure 1:
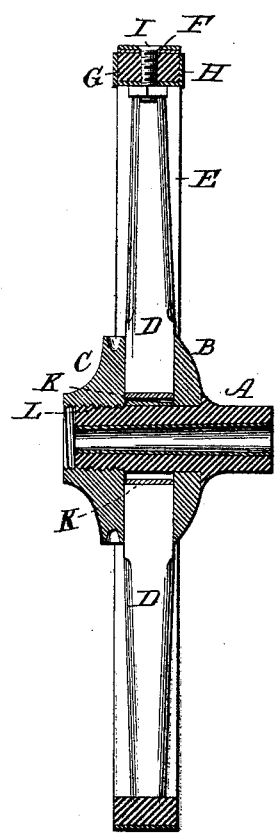
Figure 2:
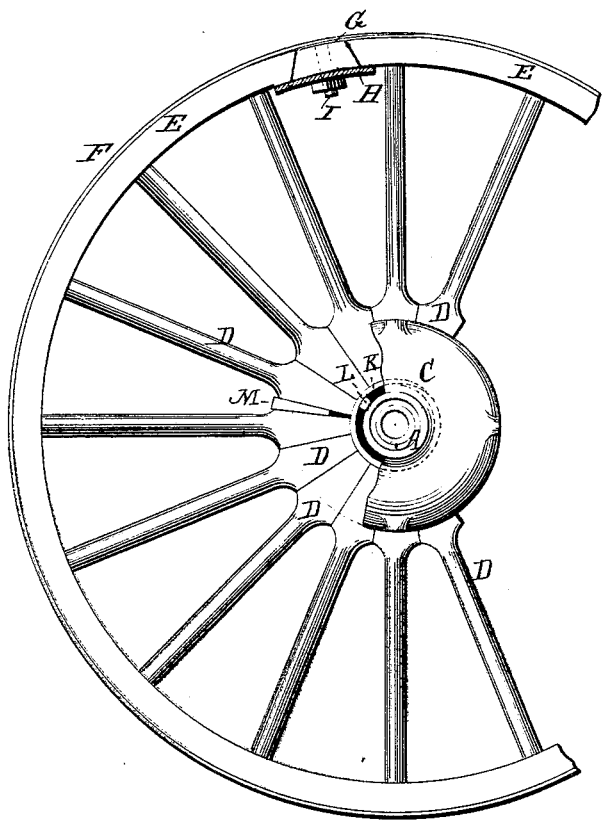

In the accompanying drawings, Figure 1 is a transverse section of our improved wheel, and Fig. 2 is a side view of the same, part being broken away.

The axle-box A has a circular shoulder, against which the metal disk B abuts. The corresponding disk C is screwed on the outer end of the axle-box, and the spoke-tenons D are clamped between said disk, as in other wheels of this class. The butts of the spokes D do not rest on the axle-box A, but upon an expansible metal ring or sleeve, K, which is divided and lapped transversely, as shown in dotted lines, Fig. 2. Between this ring K and the box A is inserted a wedge or wedges, L, for the purpose of expanding the former, and thus forcing the spokes outward when required. A wedge, M, is also inserted between the spoke-tenons at any required points, for the same purpose—to wit, to compensate for shrinkage, &c., and to hold the wooden parts of the wheel firmly in place, so that it may have the necessary rigidity as a whole. In other words, the tire F may be tightened by expanding the rim or felly E from the center by means of wedges L, and if a spoke becomes loose or broken it may be tightened or a new one inserted in a short time and with little labor.

The felly E is constructed in one piece and secured to the tire, and may be expanded by means of a wedge-block, G, clip H, and bolt I, the latter passing through the lapped ends of the tire and also through the block and clip.

Having thus described our invention, what we claim as new is—

1. In a vehicle-wheel, the combination, with the axle-box and spokes, of a divided expansible ring, on which the spoke-tenons rest, and a wedge or wedges inserted between said ring and axle-box, as and for the purpose specified.

2. In a vehicle-wheel, the combination of wedge M with the axle-box and the spoke-tenons, which are in contact, as shown, and the expansible ring K and wedge L, as specified.

STEPHEN H. FRENCH.
WM. J. MALTBY.

Witnesses:
ELI THAYER, Jr.,
WM. H. PARVIN.